(12) United States Patent
Hennessey

(10) Patent No.: US 6,612,534 B2
(45) Date of Patent: Sep. 2, 2003

(54) STAND ASSEMBLY HAVING ANTI-ROTATION FEATURE

(76) Inventor: James R. Hennessey, 7 Sunrise Hill Dr., West Hartford, CT (US) 06107

( * ) Notice: Subject to any disclaimer, the term of this patent is extended or adjusted under 35 U.S.C. 154(b) by 0 days.

(21) Appl. No.: 09/933,247

(22) Filed: Aug. 20, 2001

(65) Prior Publication Data

US 2002/0175261 A1 Nov. 28, 2002

Related U.S. Application Data

(63) Continuation-in-part of application No. 09/862,938, filed on May 22, 2001.

(51) Int. Cl.[7] .............................................. F16M 11/00
(52) U.S. Cl. ................... 248/519; 248/161; 248/346.04; 248/523; 248/406.1
(58) Field of Search .................... 403/348, 349; 248/519, 161, 523, 910, 346.04, 406.1, 407, 408, 409; 84/327

(56) References Cited

U.S. PATENT DOCUMENTS

| | | | | | |
|---|---|---|---|---|---|
| 549,434 A | * | 11/1895 | Budd | .......................... | 24/102 E |
| 2,527,256 A | * | 10/1950 | Jackson | .......................... | 285/82 |
| 3,007,014 A | * | 10/1961 | Bentman | .......................... | 248/161 |
| 3,423,781 A | * | 1/1969 | Henson | .......................... | 15/145 |
| 3,655,156 A | * | 4/1972 | Petrie | .......................... | 248/188.7 |
| 3,856,253 A | * | 12/1974 | Seebinger | .......................... | 248/411 |
| 4,398,322 A | * | 8/1983 | Ewen | .......................... | 24/595.1 |
| 4,518,162 A | * | 5/1985 | Oates | .......................... | 403/349 |
| 4,718,624 A | * | 1/1988 | Greulich | .......................... | 248/158 |
| 4,793,611 A | * | 12/1988 | Thornell | .......................... | 16/343 |
| 4,935,996 A | * | 6/1990 | Ferrara | .......................... | 24/33 R |
| 5,046,693 A | * | 9/1991 | Browne | .......................... | 248/159 |
| 5,497,965 A | * | 3/1996 | Mathieu, Jr. | .......................... | 248/159 |
| 5,833,199 A | * | 11/1998 | Benting et al. | .......................... | 248/414 |
| 5,887,948 A | * | 3/1999 | Hannes | .......................... | 248/118 |
| 6,105,194 A | * | 8/2000 | Rudolph | .......................... | 15/143.1 |

* cited by examiner

Primary Examiner—Korie Chan
Assistant Examiner—Ingrid Weinhold
(74) Attorney, Agent, or Firm—Ira S. Dorman

(57) ABSTRACT

A microphone stand assembly includes an automatically operated anti-rotation arrangement for preventing inadvertent disengagement of the shaft from the base.

19 Claims, 3 Drawing Sheets

STAND ASSEMBLY HAVING ANTI-ROTATION FEATURE

CROSS-REFERENCE TO RELATED APPLICATION

This is a continuation-in-part of application Ser. No. 09/862,938, entitled "Stand Base Having Modified Hexagonal Configuration," filed by Applicant on May 22, 2001.

BACKGROUND OF THE INVENTION

A wide variety of stands are utilized in the entertainment industry, as well as in other fields, for supporting microphones ("mics"), speakers, lighting, musical instruments, music scores, etc. The industry standard for a mic stand employs a round, sand-cast base that measures about 10 inches in diameter and weighs about six pounds, with which a shaft is threadably assembled. The shaft will usually consist of two telescoping tubular sections operatively interengaged by a center clutch for permitting height adjustment, the most widely used form of clutch being operated by rotation of a collar attached to the lower shaft section.

Albeit a convenient and practical arrangement, there is a chronic tendency for operation of a rotary clutch to cause disengagement (i.e., loosening) of the shaft from the base. The same annoyance would of course be inherent in other assemblies in which a shaft or post is engaged with a base by a movement having a significant rotational component.

SUMMARY OF THE INVENTION

Accordingly, it is a broad object of the present invention to provide a novel stand assembly, and a novel base suitable for use therein, wherein and whereby inadvertent disengagement is prevented by means of an automatically operating anti-rotation feature.

It is also an object of the invention to provide such a stand assembly and base wherein and whereby assembly and disassembly are quick and easy, and wherein there is no need for any supplemental manual fastener, such as a conventional thumbscrew and cooperating dimple or crease arrangement.

It has now been found that certain of the foregoing and related objects of the invention are attained by the provision of a stand assembly comprised of a ground-engaging base, a shaft, and means for attaching the shaft to the base. The means for attaching will include a normally upwardly opening base aperture (i.e., an aperture that opens upwardly when the base is resting on the ground), an end portion of the shaft that is dimensioned and configured for engagement within the base aperture, and automatically operating anti-rotation means for inhibiting relative rotation between the shaft and the base, and thereby for preventing inadvertent disengagement.

In one embodiment the end portion of the shaft and the sidewall defining the base aperture will be matingly threaded, preferably with a pitch that provides no more than twelve, and more advantageously fewer than twelve, threads per inch. A ratchet mechanism, effective for releasably interengaging the shaft against unscrewing from the base member, will advantageously provide the anti-rotation means, which mechanism with desirably be foot-operated for release. The shaft will usually comprise a plurality of telescopically interengaged sections, and clutch means for releasably affixing the sections in positions of relative extension, the latter including an operating member that is disposed on the shaft sections and is rotatable in the direction of unscrewing of the shaft from the base, for release of the sections for relative telescopic movement. In addition, the shaft (and/or the aperture-defining sidewall structure of the base) may have means thereon defining a ramp surface that is inclined outwardly of the aperture and toward the axis of the shaft, for cooperation with an element on the sidewall structure (and/or on the shaft) that is constructed and disposed for engaging the ramp surface, with the shaft and base in the "relative" orientation, and for producing a wedging action as the shaft is urged outwardly of the aperture by the biasing means.

Alternative anti-rotation means may comprise a locking arrangement having features that permit shaft insertion in one orientation relative to the base, and that lock the shaft in a second orientation, the respective shaft orientations being displaced from one another by an angular distance no greater than one-half turn of the shaft (i.e., 180°), and preferably no greater than one-quarter turn. Such a locking arrangement may more specifically comprise a continuous groove extending along the sidewall of the base member aperture, and a stud projecting laterally (i.e., radially) from the shaft and dimensioned and configured for slidable engagement in the groove. An entrance section of the groove extends inwardly into the base member from the mouth of the aperture, and a blind section of the groove, connected to an inner end of the entrance section, extends generally outwardly toward the aperture mouth but terminates short thereof; the groove may, for example, advantageously be of generally J-shaped configuration. Such a locking arrangmenet will usually additionally include biasing means operatively disposed for urging the shaft outwardly of the aperture.

DETAILED DESCRIPTION OF THE PREFERRED AND ILLUSTRATED EMBODIMENTS

Figure 1:
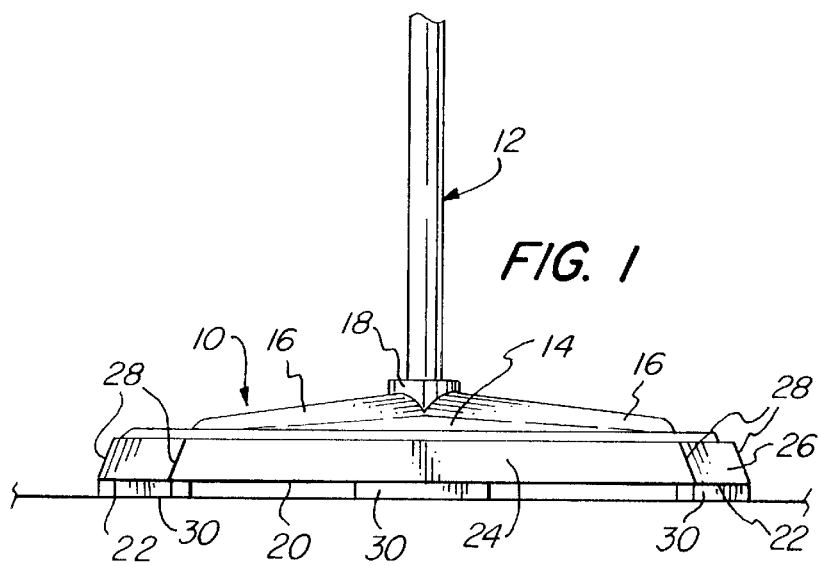
FIG. 1 is a fragmentary side elevational view of a stand assembly of a form that is generally suitable for use in the present invention, but which omits the anti-rotation securing feature hereof.
Figure 2:
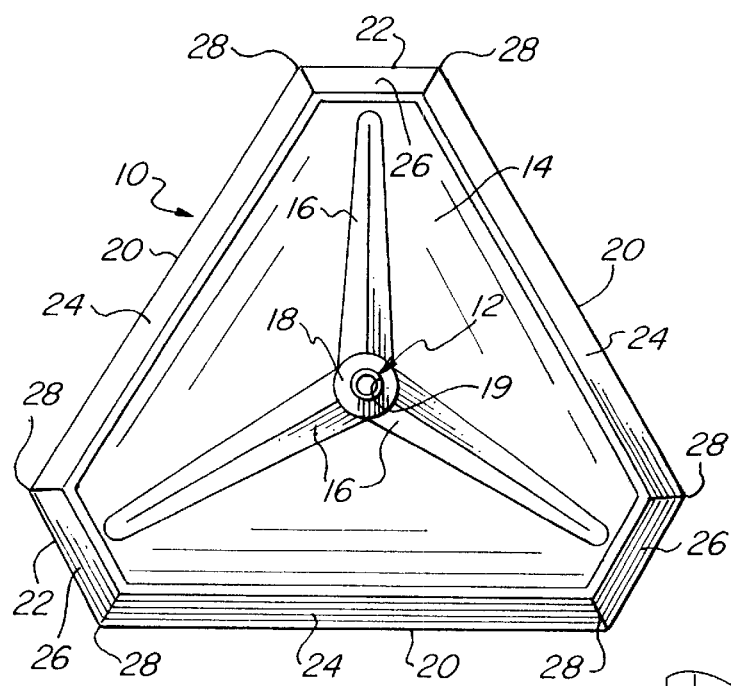
FIG. 2 is a plan view of the assembly of FIG. 1.

Turning initially to FIGS. 1 and 2 of the drawings, therein illustrated is a stand assembly, suitable for use in supporting a mic, which consists of a base, generally designated by the numeral 10, and a post or shaft generally designated by the numeral 12. The base comprises a base member of modified hexagonal peripheral configuration, including an interior web portion 14 having three upwardly projecting raised ridges 16 thereon, the ridges extending radially from a circular hub portion 18 at 120° angular intervals. Each ridge 16 is of inverted V-shaped cross section and tapers (in both height and width) in an outward direction relative to the hub portion 18.

The periphery of the base member is defined by three relatively long edges 20 and three interposed relatively short sections 22, with corresponding marginal surfaces, 24 and 26 respectively, which are inwardly and upwardly inclined (in the normal disposition of the stand assembly). The adjacent edges 20, 22, and the marginal surfaces 24, 26, intersect at apices 28, and each of the longer edges 20 and a parallel opposing shorter edge 22 extends perpendicular to the axis on which one of the raised ridges 16 is disposed. Thus, the base member is symmetrical about each of three axes, mutually spaced by 120°.

The base 10 also includes three elongated, bar-like feet 30 of rectangular cross section, typically fabricated from a durable natural or synthetic rubbery material and extending along substantially the length of each shorter edge 22 of the base member in underlying, directly adjacent relationship thereto. Each foot 30 therefore extends effectively between two adjacent apices 28 on the periphery of the base member and provides a floor-engaging element thereat, and each ridge 16 bisects one of the feet 30, contributing to a desirable weight distribution.

The shaft 12 of the stand assembly consists of a smaller diameter (usually ⅝" I.D.) tubular section 32 having a coupling piece 34 at its upper end, and a larger diameter (usually ⅞" I.D.) tubular section 36 in which section 32 is telescopically received, the sections 32, 36 normally being fabricated from lengths of steel tubing. A conventional friction clutch arrangement, including rotating collar 38, is provided at the upper end of the section 36 for maintaining the position of extension of the inner section 32 relative thereto. A solid plug, generally designated by the numeral 40 and normally also made of steel, includes a cylindrical stub portion 42 received within the lower end of the tubular member 36 and affixed thereto (as by welding), a threaded engagement portion 44, and an annular flange portion 46 disposed therebetween and abutted against the end of the tubular section 36. The threaded portion 44 of the plug 40 is typically one inch long and 11/16 inch in diameter, and provides the means for assembling the shaft 12 with the base 10, the hub portion 18 of which is of course formed with a threaded, axially extending aperture 19 for that purpose.

It is to be noted that the threads on the engagement portion 44 of the plug 40 and (albeit not shown) on the sidewall of the aperture 19, are large and coarse, with the structures typically providing twelve, and preferably fewer, threads per inch. This is to be contrasted with conventional components, which normally provide 27 threads per inch (American standard) formed directly upon the end of the tubular member, and greatly facilitates assembly and disassembly while contributing to durability. Specifically, the components can be assembled "blindly" and from a standing position, without need to hold them for close inspection so as to avoid misalignment, and the likelihood of damaging the threads, by crossing them or through impact, is reduced (not only because the threads are coarse but also because they are provided on a solid metal plug).

Figure 3:
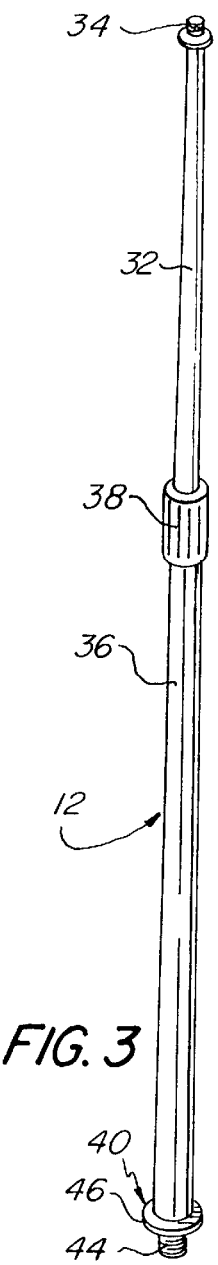
FIG. 3 is a perspective view of an extensible shaft suitable for use as a component of the stand assembly.
Figure 4:
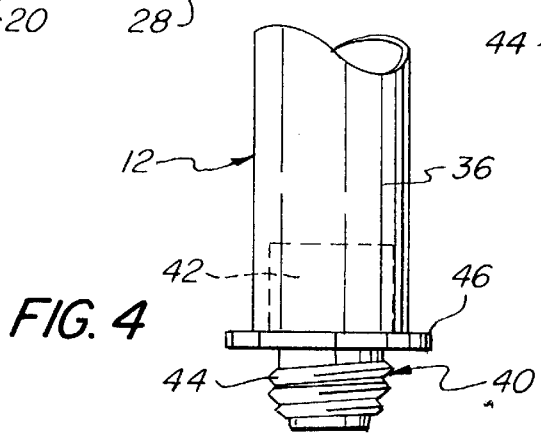
FIG. 4 is a fragmentary side elevational view of the bottom end portion of the shaft of FIG. 3, drawn to a greatly enlarged scale.
Figure 5:
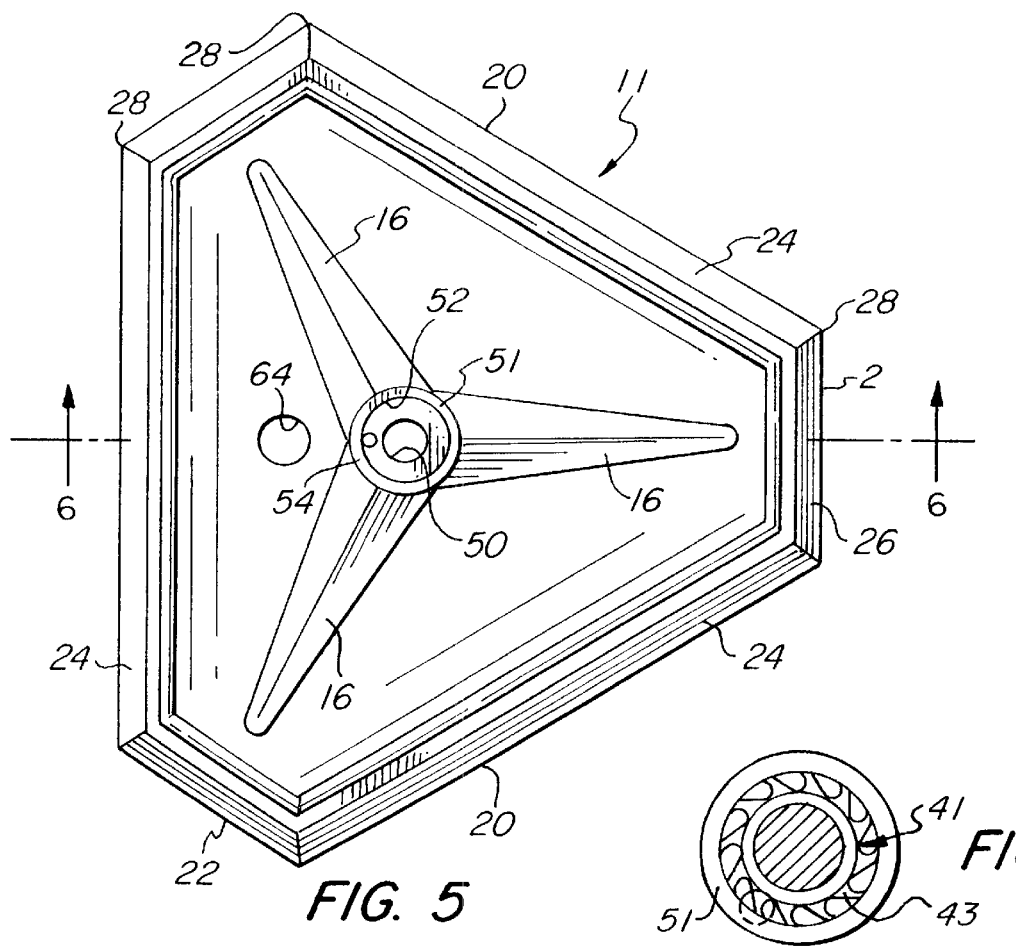
FIG. 5 is a plan view of a stand base embodying the present invention.

The stand assembly depicted in FIGS. 5 through 8 incorporates anti-rotation means in accordance with the present invention, for locking the shaft against rotation relative to the base so as to prevent the inadvertent loosening that tends to occur when the shaft sections are secured by a clutch mechanism having a rotating operating collar 38, as illustrated in FIG. 3. As will be appreciated, the clutch is such that release is effected by turning the collar 38 in the direction in which the shaft itself is unscrewed from the base.

Figure 6:
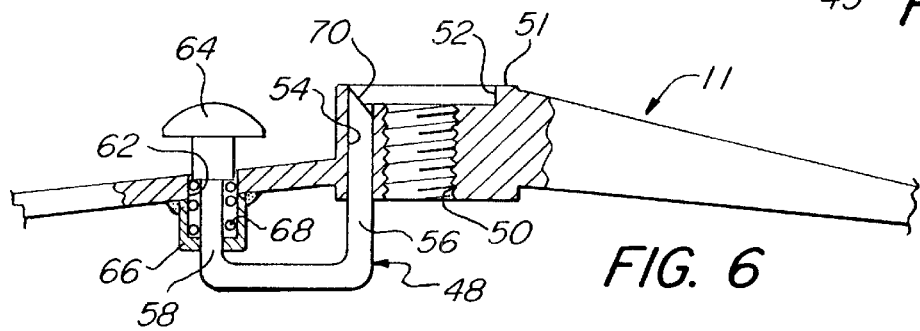
FIG. 6 is a fragmentary view of the base of FIG. 5, shown in partial section.

More particularly, and as is best seen in FIG. 6, the locking mechanism is mounted on the base member, generally designated by the numeral 11, and consists of a U-shaped operating rod, generally designated by the numeral 48, having a longer arm 56 and a shorter arm 58. The longer arm 56 extends through a small hole 54 adjacent and parallel to the threaded aperture 50 in the hub portion 51 of the base member 11, and the shorter arm 58 extends through a small cup-like housing 66, welded to the underside of the web portion 14, and an overlying hole 62. A cap or bolt head 64 is threadably engaged on the end of the shorter arm 58, to effectively provide a foot pedal for operating the locking mechanism, and the rod 48 is biased toward a raised position by coil spring 68 (shown broken away), which is contained within the housing 66 and bears upon the end wall thereof and the bottom of the bolt head 64. The passage 54 opens to a shallow annular recess 52 formed concentrically with the aperture 50 in the hub portion 51, and the upper end of the arm 56 is bevelled at 45° to provide a substantially flat face 70 oriented generally parallel to radii from the axis of the aperture 50.

Figure 8:
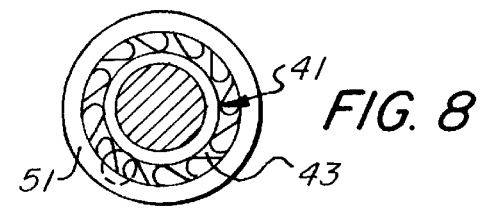
FIG. 8 is a top view of the assembly of FIG. 7, taken along line 8—8 thereof.
Figure 7:
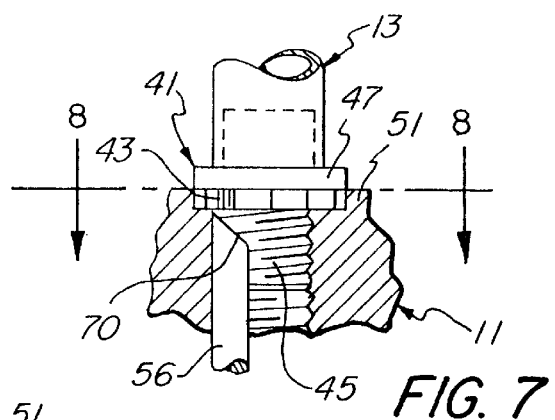
FIG. 7 is a fragmentary sectional view of the base of FIGS. 5 and 6, with which is assembled a fragmentarily illustrated shaft, only the lower end portion of which is shown.

As is best seen in FIGS. 7 and 8, a plug insert, generally designated by the numeral 41, is affixed within the bottom end of the shaft generally designated 13, and includes a ratchet wheel 43 disposed between the threaded end portion 45 and the annular flange 47. As will be appreciated, when the U-shaped rod 48 is in its elevated position (as depicted in FIG. 6) the tip of the arm 56 is disposed within the recess 52. The bevel of the flat face 70 thereon, and the resilient deflectability of the rod 48, enable rotation of the ratchet wheel 43, and hence rotation of the shaft 13, in only one direction; i.e., the wheel 43 rides over the face 70 when the shaft is rotated in the clockwise direction (as viewed in FIG. 8), whereas the teeth of the wheel 43 catch behind the upper shoulder on the tip of the arm 56 when rotation in the opposite direction is attempted. Downward force upon the bolt head 64 will of course retract the arm 56 to a position sufficiently below the ratchet wheel 43 as to permit counterclockwise rotation of the shaft 13, thereby enabling disassembly from the base when desired.

Figure 9:
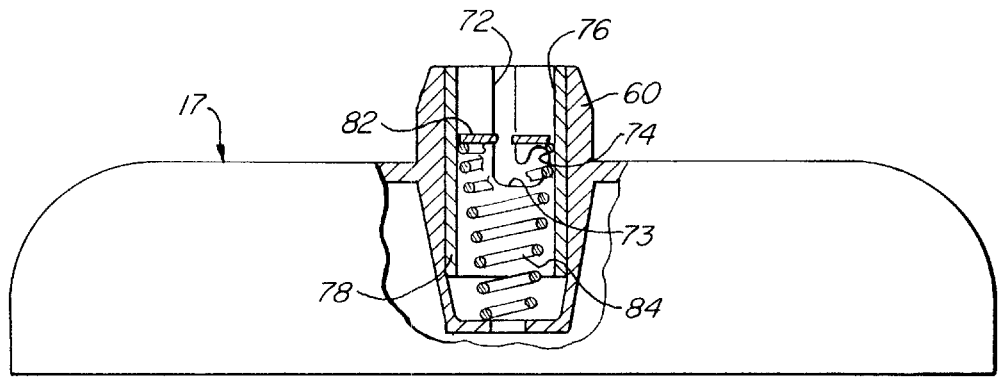
FIG. 9 is an elevational showing a second stand base embodying the present invention, with a portion broken away to expose internal features.
Figure 10:
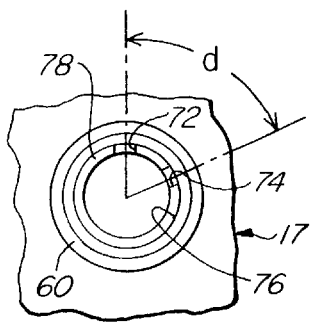
FIG. 10 is a fragmentary plan view of the base of FIG. 9.
Figure 11:
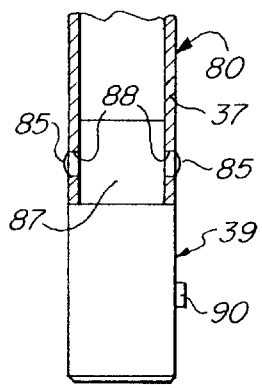
FIG. 11 is a fragmentary elevational view, in partial section, showing a shaft suitable for use with the base of FIGS. 9 and 10.

An alternative anti-rotation arrangement is depicted in FIGS. 9 through 11. The hub portion 60 of the base member, generally designated 17, provides an upwardly opening well 76, which is of uniform circular cross section along most of its length but tapers slightly at the bottom. A metal sleeve 78 is affixed within the well 76 and is routed to form a J-shaped slot comprised of a relatively long, axially extending leg 72, a relatively short inclined leg 74 (blind at its upper end, and not therefore actually visible, as is otherwise suggested in FIG. 10 for the sake of illustration), and a circumferential connecting section 73. A bearing disc 82 (a small portion of which is broken away) is slidably received within the sleeve 78 and is biased upwardly by a coil spring 84 (also shown partially broken away), the spring acting thereupon and upon the end wall of the hub portion 60.

The cooperating shaft, depicted in FIG. 11 and generally designated by the numeral 80, consists of a tubular section 37 and a solid plug generally designated by the numeral 39; although not shown in this Figure, it will be appreciated that the shaft 80 will normally include a telescopically received upper section and an operatively interposed clutch mechanism, as previously described. The insert portion 87 of the plug 39 is fitted with a pair of oppositely directed, spring-loaded detents 85, which are positioned to engage within small holes 88 formed diametrically through the wall of the tubular section 37, and a stud 90 extends radially from a location between the opposite ends of the plug.

The shaft 80 is assembled with the base 17 by inserting the plug 39 into the sleeve 78, the stud 90 being aligned with the longer leg 72 of the J-shaped slot to permit introduction. The bearing disc 82 is displaced downwardly by the shaft against the force of the coil spring 84; when the stud 90 reaches the circumferential section 73 at the bottom of the leg 72, the shaft 80 can be rotated slightly to effect interengagement and to align the stud 90 with the angled shorter leg 74. Upon relief of downward force the lug 90 slides obliquely upwardly into the leg 74 (to assume an orientation offset by an angle α relative to the orientation of introduction), thereby automatically locking the shaft against rotation in both directions as well as against axial disengagement. The manner of shaft disassembly is of course self-evident.

Figure 12:
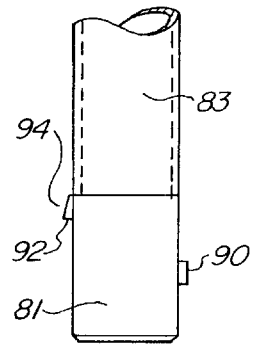
FIG. 12 is a fragmentary view showing the bottom end portion of a modified form of shaft, similar to the shaft of FIG. 11.
Figure 13:
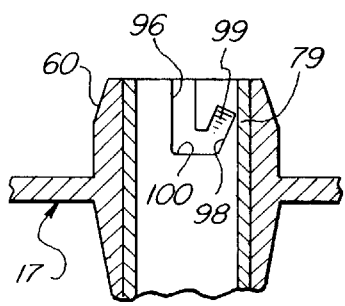
FIG. 13 is a fragmentary sectional view showing a portion of a further base embodying the invention, with which the shaft of FIG. 12 may be assembled.
Figure 14:
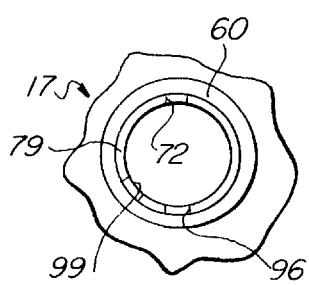
FIG. 14 is a fragmentary plan view of a portion of the base of FIG. 13.

A modification of the arrangement shown in FIGS. 9 through 11 is depicted in through FIGS. 12 and 14, and comprises a supplemental J-shaped slot formed in the sleeve 79, and a second cooperating stud 92 affixed on the shaft 83. As can be seen in FIG. 12, the second stud 92 is positioned diametrically of the stud 90 and upwardly therefrom along the length of the plug 81, and it has a bevelled end face 94 which is inclined toward the axis of the shaft 83.

The supplemental J-shaped slot is similarly positioned in a 180° relationship to the first slot, and upwardly therefrom along the length of the sleeve insert 79. It consists of relatively long and relatively short legs 96, 98 respectively, connected by a circumferential section 100 (which of course lies closer to the mouth of sleeve 79 than the corresponding section 73 of the first J-shaped slot). The outer limit (in a radial sense) of the shorter leg 98 is defined by a small ramp element that provides a surface 99 which slopes inwardly and upwardly. The face 94 of the stud 92 wedgingly engages the ramp surface 99 as the stud moves upwardly therealong, tightening the joint and serving to secure the shaft against undesired movement.

Although the bases described are of one-piece metal construction, with depending rubber feet for ground contact, a hollow plastic body, filled with water, sand, or other ballast material and designed to rest directly on the floor, might for example be substituted in appropriate circumstances. Other elements for adding and distributing weight may be employed in place of the three-pointed star structure described and, while the anti-rotation arrangements disclosed represent the best mode for practicing the invention presently contemplated, functionally equivalent mechanisms may well occur to those skilled in the art and are deemed to fall within the broad scope of the present invention. Similarly, the character of the shaft employed, and the nature of any incorporated clutch, are not intended to be limited by the description provided, albeit the anti-rotation feature is employed to particular advantage when the clutch is operated by a rotated collar, or the like. Other modifications encompassed within the scope of the appended claims will undoubtedly occur to those skilled in the art.

Thus, it can be seen that the present invention provides a novel stand assembly and a novel base suitable for use therein, wherein and whereby inadvertent disengagement of the shaft from the base is prevented. The means for preventing disengagement comprises an automatically operating anti-rotation feature, and assembly and disassembly of the shaft with and from the base are quick and easy.

Having thus described the invention, what is claimed is:

1. A stand assembly comprising a ground-engaging base, a shaft, and means for attaching said shaft to said base; said means for attaching comprising a normally upwardly opening aperture defined in said base, an end portion of said shaft dimensioned and configured for engagement within said base aperture by a relative movement, from an initial position to a spaced position, said relative movement having a rotational component in a first direction, and automatically operating anti-rotation means for inhibiting rotation of said shaft relative to said base, from said spaced position, in an opposite direction to said first direction for thereby preventing inadvertent disengagement of said end portion of said shaft from said base aperture.

2. The stand assembly of claim 1 wherein said end portion of said shaft, and sidewall structure of said base defining said aperture, are matingly threaded, and wherein said anti-rotation means comprises means for releaseably interengaging said shaft to prevent said shaft from inadvertently unscrewing from said base.

3. The stand assembly of claim 2 wherein said shaft and side sidewall structure are threaded with a pitch that provides no more than twelve threads per inch.

4. The stand assembly of claim 2 wherein said anti-rotation means comprises a unidirectional ratchet mechanism, including a manually operated release-actuating member.

5. The stand assembly of claim 2 wherein said shaft comprises a plurality of telescopically interengaged sections and clutch means for releasably affixing said sections in positions of relative extension, said clutch means including an operating member, disposed on said shaft sections, which is rotatable in the direction of unscrewing of said shaft from said base for release of said sections for relative telescopic movement.

6. The stand assembly of claim 1 wherein said anti-rotation means comprises a locking arrangement having features enabling shaft insertion, in one orientation of said shaft relative to said base, and enabling shaft locking in a second such relative orientation of said shaft, said orientations being displaced from one another by an angle of no greater than about 180°.

7. The stand assembly of claim 6 wherein said locking arrangement features comprise at least one continuous groove, formed in sidewall structure defining said upwardly opening aperture of said base, and at least one stud projecting laterally on said shaft and dimensioned and configured for slidable engagement in said groove, said groove including an entrance section, extending inwardly into said base from the mouth of said aperture, and a blind section connected to an inner end of said entrance section of said groove and extending generally outwardly toward said aperture mouth and terminating short thereof.

8. The stand assembly of claim 7 wherein said continuous groove is of generally J-shaped configuration.

9. The stand assembly of claim 7 wherein said locking arrangement additionally includes biasing means operatively disposed for urging said shaft outwardly of said aperture.

10. The stand assembly of claim 9 wherein at least one of said shaft and said aperture-defining sidewall structure of said base has means thereon defining a ramp surface inclined outwardly of said aperture and toward the axis of said shaft, and wherein the other of said shaft and sidewall structure has an element thereon constructed and disposed for wedgingly engaging said ramp surface as said shaft, disposed in said second relative orientation, is urged outwardly of said aperture by said biasing means.

11. A stand assembly comprising a ground-engaging base, a shaft, and means for attaching said shaft to said base; said means for attaching comprising a normally upwardly opening aperture defined in said base, an end portion of said shaft dimensioned and configured for engagement within said base aperture by a relative movement, from an initial position to a spaced position, said relative movement having a rotational component in a first direction, and automatically operating anti-rotation means for inhibiting rotation of said shaft relative to said base, from said spaced position, in an opposite direction to said first direction for thereby preventing inadvertent disengagement of said end portion of said shaft from said base aperture; said shaft comprising a plurality of telescopically interengaged sections and clutch means for releasably affixing said sections in positions of relative extension, said clutch means including an operating member, disposed on said shaft sections, which is rotatable in said opposite direction for release of said sections for relative telescopic movement.

12. The stand assembly of claim 11 wherein said end portion of said shaft, and sidewall structure of said base defining said aperture, are matingly threaded, and wherein said anti-rotation means comprises means for releasably interengaging said shaft to prevent said shaft from inadvertently unscrewing from said base.

13. The stand assembly of claim 12 wherein said anti-rotation means comprises a unidirectional ratchet mechanism, including a manually operated release-actuating member.

14. The stand assembly of claim 11 wherein said anti-rotation means comprises a locking arrangement having features enabling shaft insertion, in one orientation of said shaft relative to said base, and enabling shaft locking in a second such relative orientation of said shaft, said orientations being displaced from one another by an angle of no greater than about 180°.

15. The stand assembly of claim 14 wherein said locking arrangement features comprise at least one continuous groove, formed in sidewall structure defining said upwardly opening aperture of said base, and at least one stud projecting laterally on said shaft and dimensioned and configured for slidable engagement in said groove, said groove including an entrance section, extending inwardly into said base from the mouth of said aperture, and a blind section connected to an inner end of said entrance section of said groove and extending generally outwardly toward said aperture mouth and terminating short thereof.

16. The stand assembly of claim 15 wherein said continuous groove is of generally J-shaped configuration.

17. The stand assembly of claim 15 wherein said locking arrangement additionally includes biasing means operatively disposed for urging said shaft outwardly of said aperture.

18. A stand assembly comprising a ground-engaging base, a shaft, and means for attaching said shaft to said base; said means for attaching comprising a normally upwardly opening aperture defined in said base, an end portion of said shaft dimensioned and configured for engagement within said base aperture by a relative movement said relative movement having a rotational component in a first direction, and automatically operating anti-rotation means for inhibiting rotation of said shaft relative to said base in an opposite direction to said first direction for thereby preventing inadvertent disengagement of said end portion of said shaft from said base aperture;

said anti-rotation means comprising a locking arrangement having features enabling shaft insertion, in one orientation of said shaft relative to said base, and enabling shaft locking in a second such relative orientation of said shaft, said orientations being displaced from one another by a angle of no greater than about 180°;

said locking arrangement features comprising at least one continuous groove, formed in sidewall structure defining said upwardly opening aperture of said base, and at least one stud projecting laterally on said shaft and dimensioned and configured for slidable engagement in said groove, said groove including an entrance section, extending inwardly into said base from the mouth of said aperture, and a blind section connected to an inner end of said entrance section of said groove and extending generally outwardly toward said aperture mouth and terminating short thereof;

said locking arrangement additionally including biasing means operatively disposed for urging said shaft outwardly of said aperture, and at least one of said shaft and said aperture-defining sidewall structure of said base having means thereon defining a ramp surface inclined outwardly of said aperture and toward the axis of said shaft, the other of said shaft and sidewall structure having an element thereof constructed and disposed for wedgingly engaging said ramp surface as said shaft, disposed in said second relative orientation, is urged outwardly of said aperture by said biasing means.

19. The stand assembly of claim 18 wherein said continuous groove is of generally J-shaped configuration.

* * * * *